US008240054B2

(12) United States Patent
Peterson

(10) Patent No.: US 8,240,054 B2
(45) Date of Patent: Aug. 14, 2012

(54) METHOD FOR MANUFACTURING A SUPPORT BEAM THAT INCLUDES PROVIDING AN ALIGNMENT TOOL AND TWO PIECES OF STRIP MATERIAL WHEREIN EACH PIECE OF STRIP MATERIAL IS CURVILINEAR AND THE ALIGNMENT TOOL IS USED TO POSITION THE STRIP DURING A JOINING OPERATION

(75) Inventor: Robert L. Peterson, Portland, OR (US)

(73) Assignee: CCM, Inc., Beaverton, OR (US)

( * ) Notice: Subject to any disclaimer, the term of this patent is extended or adjusted under 35 U.S.C. 154(b) by 570 days.

(21) Appl. No.: 12/253,862

(22) Filed: Oct. 17, 2008

(65) Prior Publication Data
US 2010/0095527 A1 Apr. 22, 2010

(51) Int. Cl.
B23P 11/00 (2006.01)
B23K 37/047 (2006.01)
B23K 37/04 (2006.01)

(52) U.S. Cl. .................. 29/897.35; 29/407.09; 29/407.1
(58) Field of Classification Search ................. 29/897.3, 29/897.35, 407.09, 407.1, 412, 417, 521
See application file for complete search history.

(56) References Cited

U.S. PATENT DOCUMENTS

| 2,026,274 | A | * | 12/1935 | Doyle | 33/429 |
|---|---|---|---|---|---|
| 2,606,583 | A | * | 8/1952 | O'Connor | 269/93 |
| 2,794,650 | A | | 6/1957 | Schilberg | |
| 2,844,864 | A | * | 7/1958 | Schilberg | 29/897.35 |
| 3,030,988 | A | * | 4/1962 | Collins et al. | 29/281.1 |
| 3,083,007 | A | * | 3/1963 | Campfield | 269/151 |
| 3,129,493 | A | * | 4/1964 | Grubb | 29/897.31 |
| 3,260,438 | A | * | 7/1966 | Bergantini | 228/6.1 |
| 3,362,056 | A | * | 1/1968 | Preller et al. | 29/897.35 |
| 3,391,267 | A | * | 7/1968 | Rudd | 219/102 |
| 3,413,437 | A | * | 11/1968 | Hamamoto et al. | 219/81 |
| 3,491,995 | A | * | 1/1970 | Taraba | 269/8 |
| 3,616,091 | A | * | 10/1971 | Troutner | 156/560 |
| 3,731,390 | A | * | 5/1973 | Sloan et al. | 33/644 |
| 3,860,781 | A | * | 1/1975 | Aschauer et al. | 219/83 |
| 3,914,871 | A | * | 10/1975 | Wolff | 408/103 |
| 3,937,918 | A | * | 2/1976 | Robertson | 219/124.31 |
| 3,960,637 | A | * | 6/1976 | Ostrow | 156/293 |
| 4,165,869 | A | * | 8/1979 | Williams | 269/41 |
| 4,228,594 | A | * | 10/1980 | Shlager | 33/562 |
| 4,256,295 | A | * | 3/1981 | Egner | 269/45 |
| 4,281,826 | A | * | 8/1981 | Calvert | 269/41 |
| 4,300,754 | A | * | 11/1981 | Lawrence | 269/8 |
| 4,385,755 | A | * | 5/1983 | Mawer | 269/41 |
| 4,586,646 | A | * | 5/1986 | Booher | 228/44.3 |
| 4,749,176 | A | * | 6/1988 | Bradshaw | 269/41 |
| 4,795,141 | A | * | 1/1989 | Mulvaney | 269/41 |
| 4,907,735 | A | * | 3/1990 | Ushioda et al. | 228/173.4 |
| 5,192,848 | A | * | 3/1993 | Miyakawa et al. | 219/121.82 |
| 5,210,921 | A | * | 5/1993 | Booher | 29/401.1 |
| 5,364,084 | A | * | 11/1994 | Karash | 269/41 |

(Continued)

*Primary Examiner* — David Bryant
*Assistant Examiner* — Jason L Vaughan
(74) *Attorney, Agent, or Firm* — Kolisch Hartwell, P.C.

(57) ABSTRACT

The present invention generally relates to a beam suitable for providing support to, for example, an automobile body. More specifically, the present invention relates to a steel boxed I-beam structure having compound curves, formed without use of a dedicated fixture or jig. Typically, the steel boxed I-beam structure provides a strong support that can be manufactured with a minimum of effort, and without the use of heavier shop machinery.

14 Claims, 4 Drawing Sheets

U.S. PATENT DOCUMENTS

| | | | |
|---|---|---|---|
| 5,412,913 A * | 5/1995 | Daniels et al. | 52/79.13 |
| 5,456,015 A * | 10/1995 | Butcher et al. | 33/451 |
| 5,556,565 A * | 9/1996 | Kirkwood et al. | 219/633 |
| 5,884,904 A * | 3/1999 | Martini | 269/41 |
| 5,996,305 A * | 12/1999 | Holbert et al. | 52/745.19 |
| 6,058,673 A | 5/2000 | Wycech | |
| 6,092,864 A | 7/2000 | Wycech et al. | |
| 6,139,667 A * | 10/2000 | Sanford et al. | 156/92 |
| 6,161,361 A | 12/2000 | Ehrenkrantz | 52/847 |
| 6,272,758 B1 * | 8/2001 | Wheeler | 33/1 G |
| 6,297,472 B1 * | 10/2001 | Bong et al. | 219/125.12 |
| 6,305,136 B1 | 10/2001 | Hopton et al. | |
| 6,557,930 B1 | 5/2003 | Bruggemann et al. | |
| 6,629,372 B2 * | 10/2003 | Doyle | 33/429 |
| 6,702,270 B1 * | 3/2004 | Reschke | 269/41 |
| 6,733,040 B1 | 5/2004 | Simboli | |
| 6,844,040 B2 * | 1/2005 | Pabedinskas et al. | 428/36.91 |
| 6,896,320 B2 | 5/2005 | Kropfeld | |
| 6,976,309 B2 * | 12/2005 | Mayer et al. | 29/897.2 |
| 7,156,422 B2 | 1/2007 | Verhaeghe | |
| 7,213,379 B2 * | 5/2007 | Carlson et al. | 52/837 |
| 7,647,681 B1 * | 1/2010 | Harris et al. | 29/281.1 |
| 2002/0116834 A1 * | 8/2002 | Doyle | 33/429 |
| 2010/0154194 A1 * | 6/2010 | Harris et al. | 29/464 |

* cited by examiner

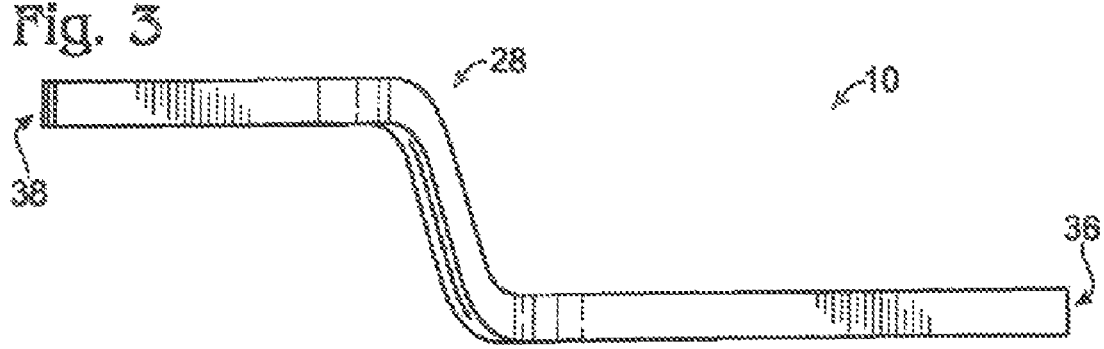
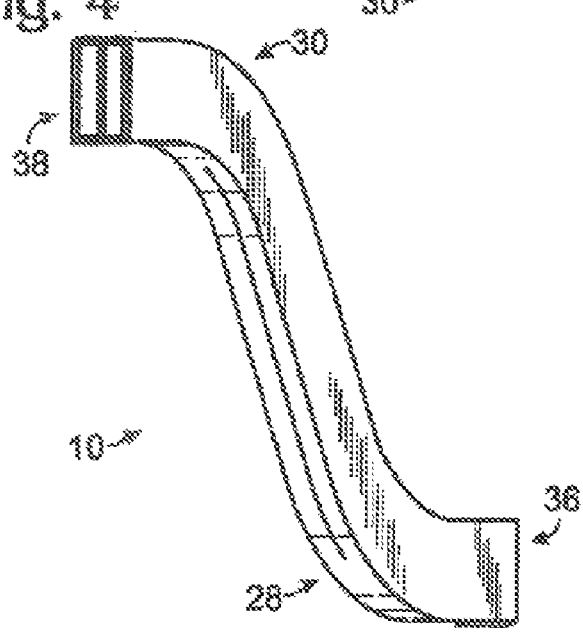
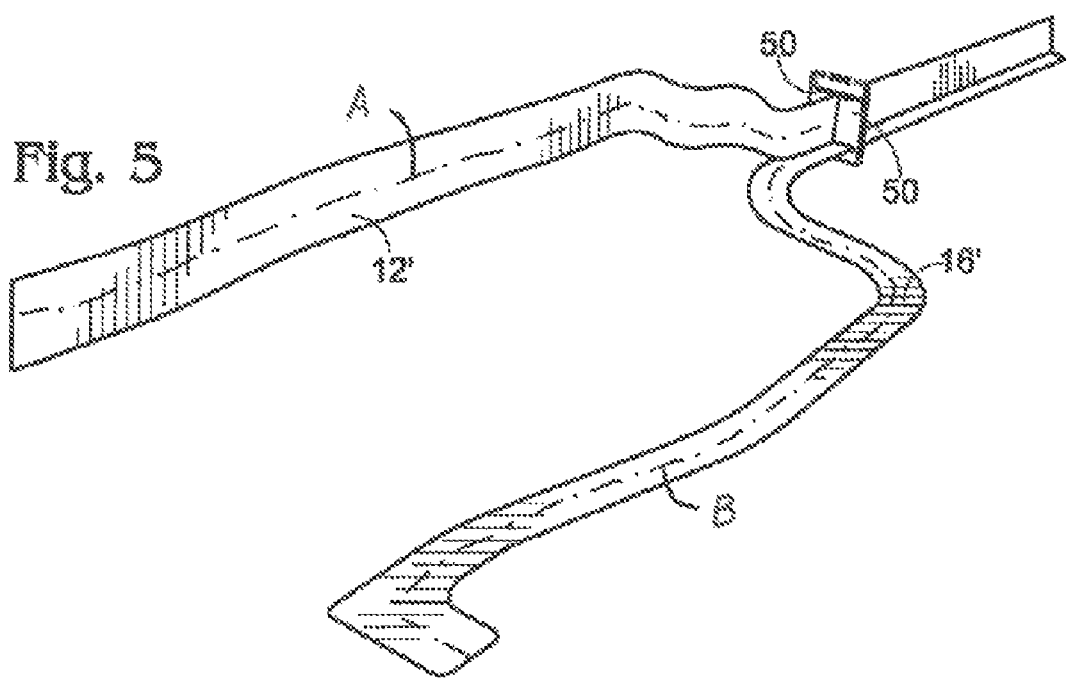

METHOD FOR MANUFACTURING A SUPPORT BEAM THAT INCLUDES PROVIDING AN ALIGNMENT TOOL AND TWO PIECES OF STRIP MATERIAL WHEREIN EACH PIECE OF STRIP MATERIAL IS CURVILINEAR AND THE ALIGNMENT TOOL IS USED TO POSITION THE STRIP DURING A JOINING OPERATION

BACKGROUND

Steel support beams have many applications. They may be used to support architectural forms and building structures. Steel support beams may also be used in building vehicles or rebuilding damaged vehicles.

Typically, a support beam, whether constructed of steel or another support material, is constructed of pieces joined at angular intersections. For example, two portions of a steel beam may be welded at a 45-degree angle, or a 90-degree angle, or another angle appropriate to the final use of the beam. Beams made of other materials may be adhered to one another, or may be bolted together with brackets, etc.

A beam that includes smooth curves will often require the use of a jig or fixture and heavy tools to form its final structure. For example, placing a beam in a jig and bending it progressively to a final structure may result in construction of a curved beam. Alternatively, first portions of a beam may be removed so that other portions may be bent, with the first portions (or replacement portions) of the beam then being placed in their final configuration.

Because standard support beams are limited in their ability to assume nonstandard shapes (such as a beam with smooth curves, or a beam with one or more broadened portions), and because support beams often require heavy tools to form, it would be desirable to make a beam with complex shapes and/or with a minimum of tooling and reshaping. The described support beams, and the method of making those beams, have such characteristics. It should be appreciated that the disclosed beams and methods may be constructed of a variety of materials, as desired for a given application, and used in many situations.

Typical steel support beams and their methods of manufacture are found in U.S. Pat. Nos. 2,794,650, 2,844,864, 5,210,921, 6,058,673, 6,092,864, 6,305,136, 6,557,930, 6,733,040, 6,896,320, and 7,156,422, the disclosures of which are incorporated herein by reference.

SUMMARY

The present disclosure relates generally to a beam for providing support to a vehicle body, an architectural structure, or any other structure needing support. More specifically, it relates to a steel beam manufactured without the use of extensive machinery, and containing compound curves made without a dedicated fixture or jig.

One method of manufacturing a support beam may include providing a first piece and a second piece of beam material, arranging the first and second pieces of beam material in close spatial relation, and securing to each other the first and second pieces of beam material to form the support beam. A support beam formed by the method may have a width dimension on a first axis, a height dimension on a second axis, and a length dimension on a third axis, where the length dimension is measured from a first end to a second end of the support beam, and the second end of the beam may be displaced from the first end along both the first and second axes.

The pieces of beam material used in the manufacturing method may be cut or otherwise formed from material stock, and the stocks for the first and second pieces may be substantially the same material (such as steel, wood, plastic, or another material) or they may be of different materials (such as one of steel and one of a plastic). Typically, for pieces made from a stock material, such as steel, the pieces may be cut by water jet cutting or laser cutting, but any appropriate method of cutting or forming the component pieces of a beam may be used.

An extension of the method described above may further include providing a third piece of beam material, and arranging the third piece of beam material in close spatial relation to the first and second pieces of beam material such that the first, second, and third pieces of beam material form an I-shaped support beam. In some embodiments, the I-shaped support beam may have a width dimension on a first axis, a height dimension on a second axis, and a length dimension on a third axis, with the length dimension measured from a first end to a second end of the I-shaped support beam, and the second end of the I-shaped support beam may be displaced from the first end along both the first and second axes of the I-shaped support beam.

A further extension of the method described above may include providing fourth and fifth pieces of beam material, arranging the fourth and fifth pieces of beam material in close spatial relation to the first, second and third pieces of beam material, and securing the fourth and fifth pieces of beam material to the first, second, and third pieces of beam material to form a boxed, I-shaped support beam. In some embodiments, the boxed, I-shaped support beam may have a width dimension on a first axis, a height dimension on a second axis, and a length dimension on a third axis, with the length dimension measured from a first end to a second end of the boxed, I-shaped support beam, and the second end of the boxed, I-shaped support beam may be displaced from the first end along both the first and second axes of the boxed, I-shaped support beam.

Another method of manufacturing a support beam may include providing first and second pieces of beam material, arranging the first and second pieces of beam material in close spatial relation, and aligning into an aligned spatial relation the first and second pieces of beam material with an alignment apparatus, where the alignment apparatus is configured reversibly to embrace the first and second pieces of beam material.

This may further include securing to each other the aligned pieces of beam material such that the first and second pieces of beam material remain in an aligned spatial relation upon removal of the alignment apparatus.

An extension of this method may further include providing a third piece of beam material, and arranging the third piece of beam material in close spatial relation to the first and second pieces of beam material, where the first, second, and third pieces of beam material may be aligned with the alignment apparatus, which may reversibly embrace the first, second, and third pieces of beam material. The alignment apparatus may have a number of alignment, or support, openings having shapes complementary to the pieces of beam material, and the openings may be adjustable in position to each other and the body of the alignment apparatus.

A further extension of this method may include securing to each other the aligned pieces of beam material such that the first, second, and third pieces of beam material remain in an aligned spatial relation upon removal of the alignment apparatus.

A support beam fashioned according to this method may assume an I-beam form, or any other appropriate form for a given structural function.

The present disclosure also provides for a support beam having a width dimension on a first axis, a height dimension on a second axis, and a length dimension on a third axis, where the length dimension may be measured from a first end to a second end of the beam, and where the second end of the beam is displaced from the first end along both the first and second axes of the beam. The beam may also include at least one smooth curve between the first end and the second end.

To provide structural support, the beam may have at least a partial I-beam shape, having a first flange with first and second edges and a midline between the first and second edges, and a first web with first and second edges, where the web is secured to the flange such that either the first or second edge of the web is coupled to the midline of the first flange. The beam may also include a second flange having first and second edges and a midline between the first and second edges, where the second flange is secured to the first web such that a first or second edge of the web is coupled to the midline of the second flange.

In this structure, the first flange and the first web of the support beam may be configured to be held reversibly in alignment by an alignment tool including first and second support openings having shapes complementary to the first flange and the first web. In some embodiments, the alignment tool may be adjustable, allowing adjustment of the relative locations of the first and second support openings and, thus, the relative orientations of the flange(s) and web.

To further provide structural support, the I-beam shape may be boxed, with the beam including first and second walls each having first and second edges, where the first edges of the first and second walls are secured to the first flange, and where the second edges of the first and second walls are secured to the second flange.

BRIEF DESCRIPTION OF THE DRAWINGS

FIG. 3 is a side view of the steel beam of FIG. 1.

FIG. 4 is a front view of a first embodiment of the steel beam of FIG. 1.

FIG. 5 is a right perspective view of components used to form a second embodiment of a steel beam according to the present disclosure.

DETAILED DESCRIPTION

Figure 1:
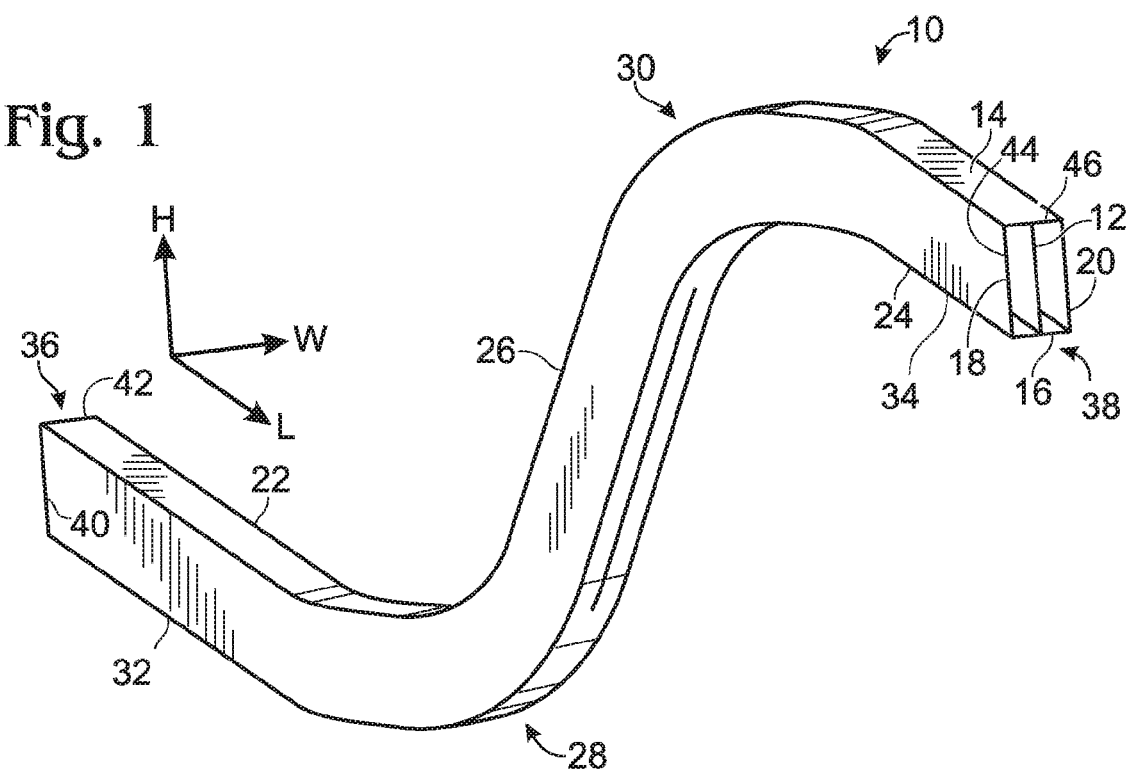
FIG. 1 is a left perspective view of a first embodiment of a steel beam according to the present disclosure.

The present disclosure describes a support beam. The support beam is typically a steel beam, and it may be used as, for example, a structural support beam in a vehicle frame. Alternatively, the support beam may be used in any application requiring a strong structural support beam including non-standard shapes (i.e. other than a typical cylinder, tube, typical combinations of those shapes, etc.). The illustrated support beam of the present disclosure is a beam having a roughly rectangular cross-section but also having complex curves along its length, which can be manufactured by a straightforward process requiring only a minimum of effort. In other embodiments, the support beam may follow a semicircular path, may include multiple curves, or take another non-standard shape.

FIGS. 1-4 show an illustrated first embodiment of a support beam 10 according to the present disclosure. The illustrated embodiment is a steel beam having a boxed I-beam shape. As such, the central portion of the beam includes a number of support elements, such as a web 12, a first flange 14, and a second flange 16. To "box" this central I-beam backbone, the illustrated beam might include a first wall 18 and a second wall 20. As illustrated, the support beam has, essentially, three vertical portions (web 12, wall 18, and wall 20) bracketed by two horizontal portions (flange 14 and flange 16). Although illustrated in this manner, it is understood that the beam may be constructed with fewer walls, fewer flanges, more webs, or any other desired combination of these support elements.

Initially, the illustrated beam can be described as having a first leg 22 and a second leg 24 at either end of a curved midportion 26. The midportion can be any shape necessary as needed for a particular application of the support beam, but the illustrated embodiment includes a first curve 28 and a second curve 30. Each of the first and second legs 22, 24 of the support beam may follow a short, substantially linear path. As such, a length edge 32 of the first leg 22 may define an axis L along which a length of a support beam may be measured. A length edge 34 of the second leg 24 may be parallel to edge 32 and, as such, may be parallel to the axis L. Typically, the length of the illustrated support beam may be measured as the distance along axis L from a first end 36 to a second end 38 of the beam.

The illustrated support beam may also have height and width dimensions. A height edge 40 may follow a substantially linear path so as to define an axis H along which a height of a support beam may be measured. In the same way, a width edge 42 may follow a substantially linear path and define an axis W along which a width of a support beam may be measured. As with the length edges 32, 34, height edge 40 of the first end 36 may have an analogous height edge 44 at the second end 38, and width edge 42 of first end 36 may have an analogous width edge 46 at the second end 38.

As is apparent from the Figures, the length, height, and width of a support beam may be measured in multiple ways. For example, the length of a support beam could be measured as the distance from the first end to the second end along the axis L. As an alternative, if the first and second ends were located closely in space (as in a support beam having a horseshoe shape, or following a semicircular path), then the length might be measured as the separation distance along axis L between the two most-separated points on the support beam.

As another example, the width of the support beam could be measured as the distance from the first wall to the second wall along the axis W (this could correspond to the width of a first or second flange, depending on construction of the beam). An alternative width could be measured as the separation distance along axis W between the two most-separated points on the support beam. In the illustrated embodiment, for example, the greatest separation on the width axis W is not the width of the first or second flanges because the illustrated support beam is not a linear structure, and the second end is displaced along the W axis from the first end (seen most clearly in FIG. 3).

As another exemplary measurement, the height of the support beam could be measured as the distance from the first flange to the second flange along the axis H (this could correspond to the width of the web, or first or second wall, depending on construction of the beam). An alternative height could be measured as the separation distance along axis H between the two most-separated points on the support beam. In the illustrated embodiment, for example, the greatest separation on the height axis H is not the height of web 12, or first wall 18 or second wall 20 because the illustrated support beam does not lie on a planar surface, the second end being displaced along the H axis from the first end (seen most clearly in FIG. 4).

The illustrated steel beam has a non-standard shape which can be described relative to a set of axes defined by the beam. In the illustrated embodiment of a support beam, the second end 38 of the support beam is displaced from the first end 36 along both the W and H axes at its location on the L axis. This three-dimensional displacement of one end from the other in the illustrated beam is the result of the presence of the first curve 28 and the second curve 30 in the midportion 26 of the beam. In other words, moving along the L axis of the beam, a comparison of the first end of the beam to the second end of the beam shows that the second end of the beam is displaced upward along the H axis and rightward on the W axis from the first end (if the point of origin of the axes is considered to be the first end of the beam).

Figure 2:
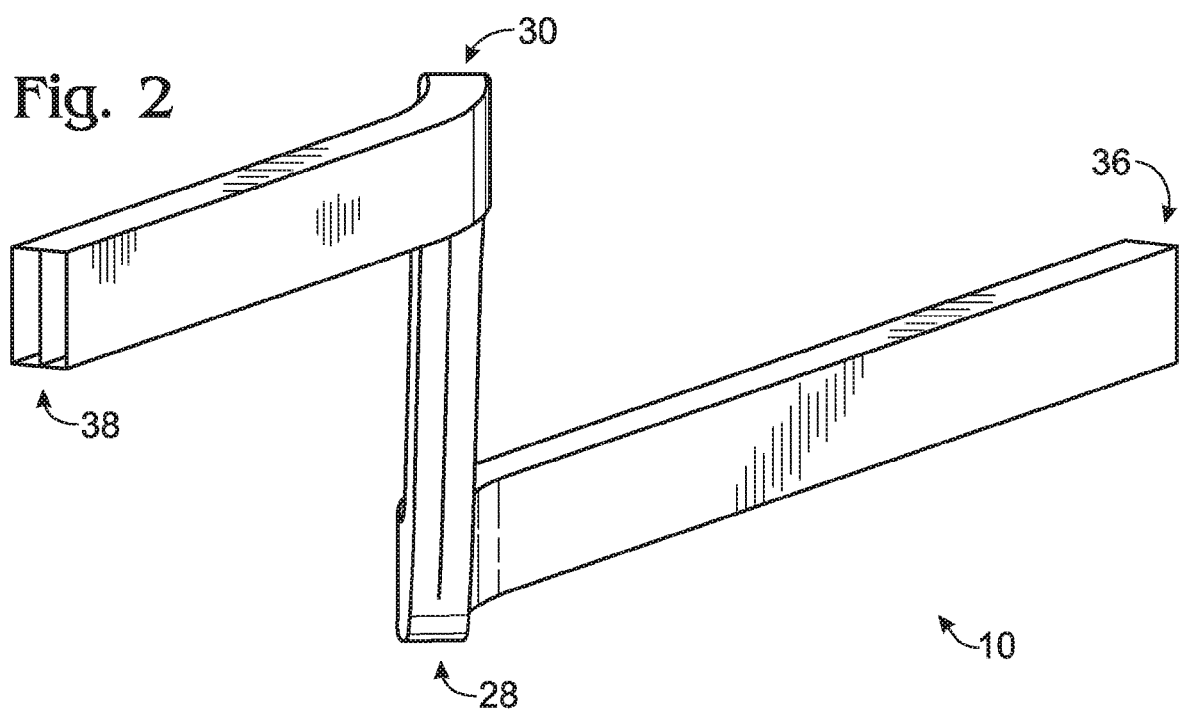
FIG. 2 is a right perspective view of the steel beam of FIG. 1.

FIGS. 2-4 show other views of the support beam of FIG. 1, making clear the complex structure of the illustrated embodiment and the two-dimensional displacement (along axes W and H) of the first and second ends of the beam. Though showing a very similar beam, FIG. 4 illustrates a beam having reverse curvature to the beams of FIGS. 1-3 (the second end of the beam of FIG. 4 is displaced to the left relative to the first end of the beam).

FIG. 5 shows two component parts, a web 12' and a flange 16', used in making a second embodiment of a steel beam according to the present disclosure. FIG. 5 shows that the component parts used in making a beam can each have multiple curves in the plane of the component material, each curve having different characteristics, to form a final beam having multiple complex curves rather than a pair of relatively simple curves (as shown in FIGS. 1-4). Additionally, web 12' and flange 16' may each be described as having a longitudinal centerline running the length of the part. Examples of these centerlines are labeled A and B, respectively, in FIG. 5.

Figure 6:
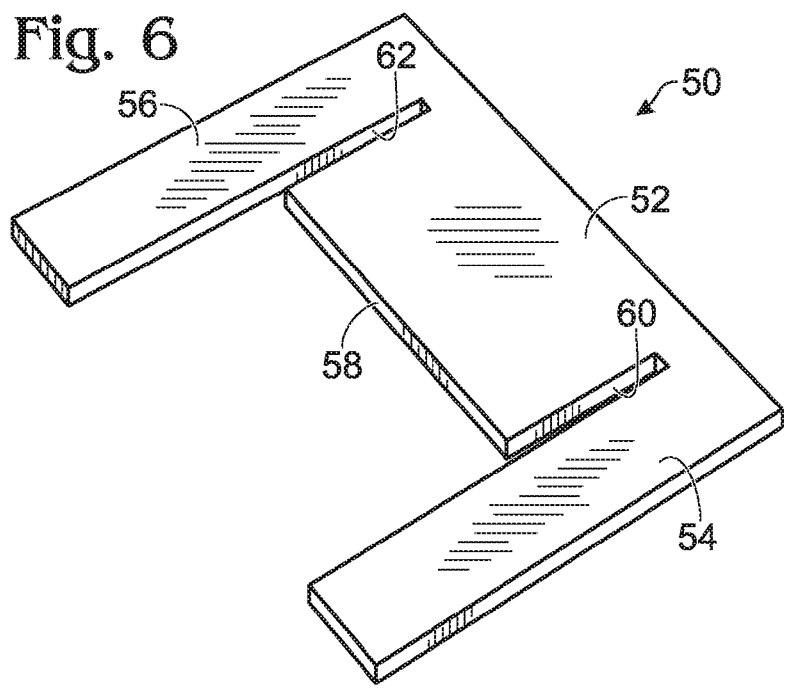
FIG. 6 is a perspective view of a first embodiment of an alignment tool according to the present disclosure.

FIG. 6 is an illustration of an alignment tool 50 according to the present disclosure, which can be used in a method of manufacturing the illustrated beams of FIGS. 1-5, and other beams according to the present disclosure. The alignment tool may generally be constructed of a relatively stiff material, being configured to hold portions of the illustrated support beam in alignment during a support beam manufacturing process. However, other materials appropriate for performing the manufacturing method described below may be used. In some embodiments, the support beam 10 and alignment body 50 are of substantially the same materials, while in other embodiments the support beam and alignment body are of substantially or somewhat different materials.

The exemplary alignment tool 50 of FIG. 6 has a roughly rectangular alignment body 52 supporting a pair of alignment legs 54, 56. In the illustrated embodiment, the alignment legs are somewhat longer than the central portion of the alignment body, thus forming an alignment surface 58 between the alignment legs. The illustrated alignment body also includes alignment openings 60, 62, formed by the close, but not complete, abutment between the alignment surface and the alignment legs.

Figure 7:
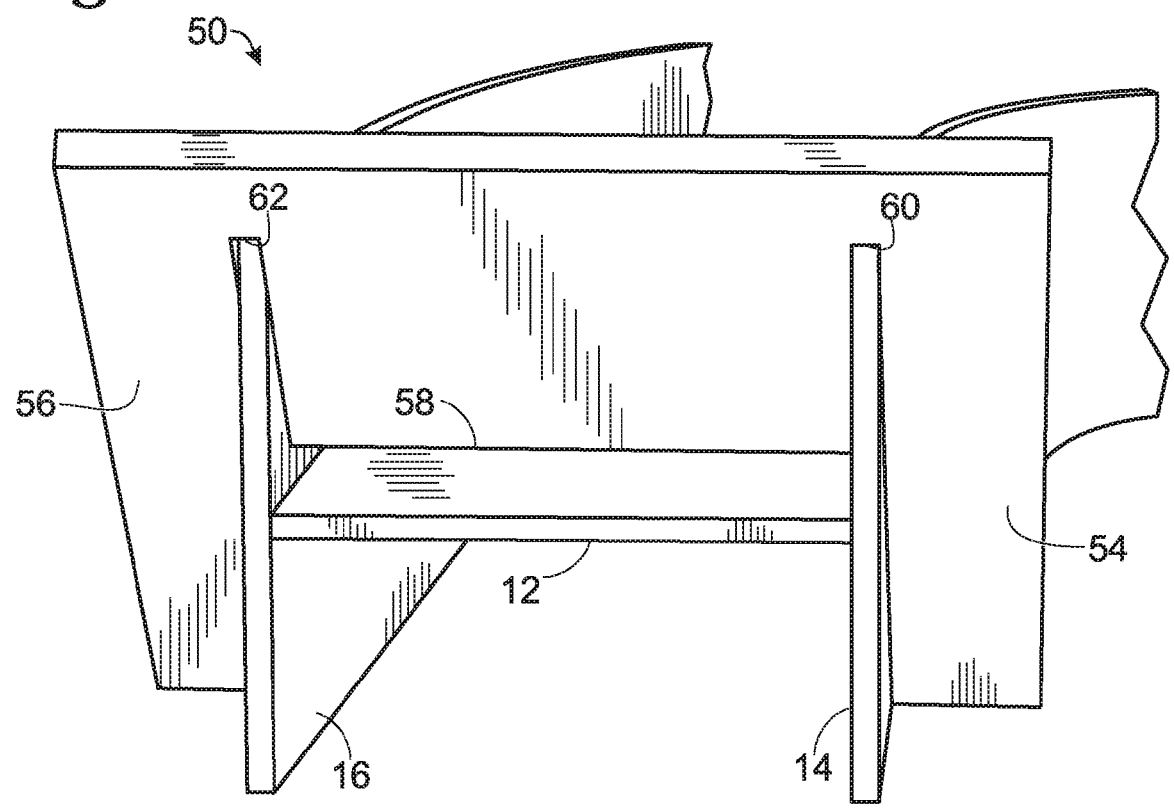
FIG. 7 is a front view of an operational relationship between the alignment tool of FIG. 6 and the steel beam of FIG. 1, according to the present disclosure.

As is apparent from the Figures, the alignment tool can be placed into an operative relationship with elements of the support beam, facilitating the manufacture of the beam. FIG. 7 is an illustration of one possible operational relationship between the alignment tool of FIG. 6 and the steel beams of FIGS. 1-5, according to the present disclosure. FIG. 7 makes clear that a given alignment tool may be useful for making a given embodiment of a support beam, since the various alignment portions of the tool may be designed to place components of the support beam into a close, temporarily fixed relationship. The temporary alignment of the elements of the support beam can then be made more permanent by, for example, welding the elements of the support beam to one another.

FIG. 7 shows an aligning relationship between alignment tool 50 and portions of a support beam 10, partway through a method of manufacturing the support beam (described in more detail below). In FIG. 7 one can see that a first flange 14 and a second flange 16 can each be slidingly inserted into alignment openings 60 and 62, respectively. As well, web 12 can be placed between the flanges so that it lays against the alignment surface 58. In this way, the central spine of the boxed I-beam can be laid out, with the three components of the central spine in temporary alignment with one another. As seen in FIG. 7, the web is aligned with the two flanges so that the web is positioned roughly along the midline of the two flanges (i.e. about midway between the two edges of each flange). Other arrangements or alignments are possible depending on the use or desired construction of the beam. For example, in some embodiments, the web may be positioned away from the midline of each flanges, such that it lies closer to one side or the other of each flange.

As is clear from the Figures, the illustrated embodiment of alignment tool 50 in FIGS. 6 and 7 is uniquely suited to making the illustrated embodiment of a support beam 10 in FIGS. 1-5 because of the placement of the alignment legs, surface, and openings. In like manner, another embodiment of alignment tool 50 could be uniquely suited for making a subtly different, or substantially different, embodiment of a support beam. For example, the alignment tool could have alignment openings that are placed at angles relative to each other, forming a beam with flanges or walls that are angled relative to each other or the web. Another embodiment might have shallower alignment openings, to accommodate or align narrower flanges. As another example, an alignment tool might be adjustable, where the alignment legs, surface, and/or openings could be moved relative to one another and then temporarily fixed in place (for example, with a series of nuts and bolts). Such an alignment tool could allow a manufacturer to make multiple types of beams with a single tool.

It bears repeating that the illustrated beam is simply one embodiment of a non-standard beam shape possible to be constructed with the method of manufacture described below. For example, the beam might follow a semi-circular path; it might contain more than two curves; and so on. Also, although the beam of the present disclosure is shown as a boxed I-beam with a web that is continuous from the first end to the second end, other designs are possible, such as a beam with a discontinuous web, or flanges with projections (as seen in FIG. 5), etc.

It also bears noting that a unique feature of the illustrated beam is the ability of the beam to embody complex curves with a minimum of effort on the part of a manufacturer of the beam. As is clear from the description of the above Figures, each of the pieces forming the central I-beam structure is a substantially planar element cut out of a substantially planar stock material. Each substantially planar element embodies a curve in a single dimension (i.e. in the plane of the stock material from which the element was cut). However, when brought together into an I-beam structure, the combination of two substantially planar elements, each having a curve in a single dimension, results in a non-planar I-beam embodying at least one complex curve (i.e. a curve having components in at least two dimensions). In the illustrated embodiment, for example, the central I-beam structure has complex curves embodying both the substantially one-dimensional "upward" (along the H axis) curve of web 12 (or 12') and the substantially one-dimensional "sideways" (along the W axis) curve of flanges 14, 16 (or 16').

Figure 8:
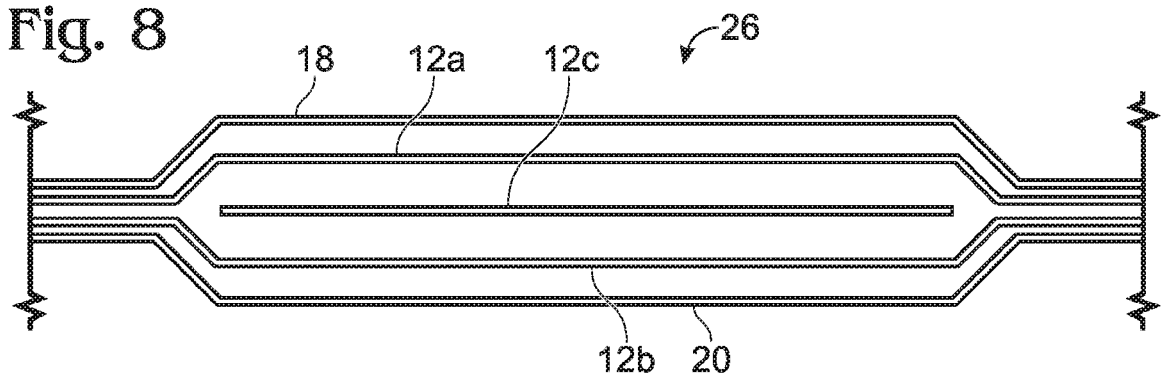
FIG. 8 is a plan cutaway view of a third embodiment of a steel beam according to the present disclosure.

An exemplary embodiment of a beam containing more than one continuous or discontinuous web within an otherwise uniform exterior is shown in cross-section in FIG. 8. Such a design may allow a beam to have a relatively shallow side profile (i.e. a small dimension along axis H) while still providing increased strength relative to the beams illustrated in FIGS. 1-5. In the embodiment of FIG. 8, the beam 10 may include a midportion 26 that is broader than the beam's first and second legs. The midportion may be broadened to include multiple webs 12 spaced from each other. Though the illustrated beam embodiment includes two walls 18, 20 and three webs (two continuous webs 12a, 12b passing from end-to-end, and one discontinuous web 12c only in the midportion), other numbers of webs are possible according to the desired performance parameters of the support beam.

Figure 9:
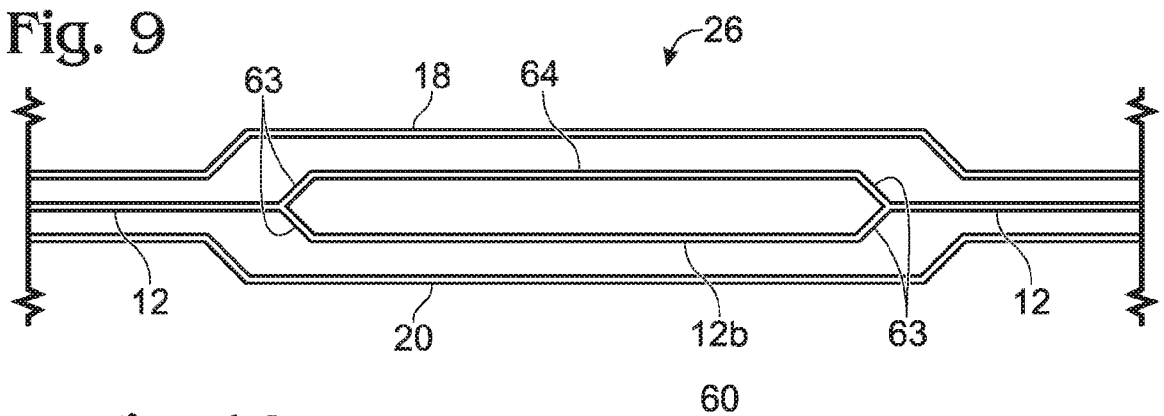
FIG. 9 is a plan cutaway view of a fourth embodiment of a steel beam according to the present disclosure.

An exemplary embodiment of a beam having a relatively broader midportion between two relatively narrower portions, with the broader portion housing multiple webs or a web having a nonlinear portion is shown in cross-section in FIG. 9. Like the embodiment of FIG. 8, this beam embodiment may allow increased strength with a shallow side profile.

In the embodiment of FIG. 9, the walls may extend outward along the midportion 26 of the support beam, much like the embodiment of FIG. 8. Rather than housing multiple webs, however, the larger midportion of the beam of FIG. 9 may house a nonstandard central web 12. The central web of the embodiment of FIG. 9 may be configured as a single-thickness plate at either of its ends. The central portion, however, of the web of this embodiment may be "split" in the middle (i.e. configured with two web arms 63 extending from the web toward the sides of the beam) such that the central portion of the web is configured as a roughly hexagonal web loop 64. As an alternative, loop 64 could be configured as a rectangular, pentagonal, ovoid, or other appropriate shape for providing structure within the larger midportion 26 of the illustrated beam.

Having described exemplary embodiments of support beams and an alignment tool, there follows a description of a method of making a typical support beam with a typical tool. The described method does not require heavy shop equipment unless heavy-gauge steel (or other material that is difficult to manipulate) is utilized in the construction. For example, 12-gauge and 10-gauge (about ⅛ inch) plate steel can be worked by hand, while ¼-inch plate steel may need to be worked with machinery, powered or otherwise.

The method may include a first step and a second step of providing a first piece of beam material; for example, providing pieces of steel from steel stock. One way of providing these pieces of steel is to cut (by, for example, laser or water jet cutting) shaped pieces of steel from a steel sheet. As noted, for easier working, the steel may be about ⅛ of an inch in thickness.

For making a boxed I-beam structure of the types illustrated in FIGS. 1-5, a user may require five pieces of shaped steel: one piece for the central web, two pieces each for the first and second flanges, and two pieces each for the first and second walls. The pieces may be held individually or as a group at one end, with the other end of each piece being manipulated by a user, or a group of cooperating users, making a support beam. Typically, a pair of users may work together to align the pieces of the support beam before fastening them into place.

The one or more users may arrange first and second pieces of the beam material into close spatial relation. One way to do this would be to align the pieces using an alignment tool 50 like the one illustrated in FIGS. 6 and 7. Initially, a user may slide an edge of one flange 14 into one of the alignment openings 60 on the alignment tool. The user may then place a web piece 12 on the alignment surface 58 of the alignment tool. In this way, an edge of the web piece may abut a midline of the adjacent flange. When one piece "abuts" another, the pieces may actually be in contact or they may merely be in sufficiently close spatial relation so that they may be connected later with a minimum of further adjustment in their positions (i.e. they may be close enough that they could be welded, glued, or otherwise fastened).

The user or cooperating users may then secure to each other the first and second pieces of beam material to form all or a portion of the support beam. To secure the first and second pieces of beam material, the user may simply tack-weld the pieces to each other as they are held in place by the alignment tool. Alternative methods of attachment may be used according the desired use of the beam or further work to be done in finishing the beam. If, for example, a simple support beam is desired, it may be enough to form the beam by securing a single flange and a single web by welding. As another example, a user or group of users may align the components of the beam with the alignment tools, and then use a series of clamps to hold the components in place. A final tack welding may then be performed along the whole length of the beam in one step.

If the support beam will have a central I-beam structure, the user may add another flange 16 to the arrangement of pieces, for example by sliding an edge of the flange 16 into an unoccupied alignment opening 62 of alignment tool 50. In this way, a relatively simple alignment tool like the one in FIGS. 6 and 7 may align two flange pieces 14, 16 and a web 12 so that each edge of the central web abuts a midline of a different flange. The web may then be tack-welded to the flange pieces or completely welded to the flange pieces, depending on the performance requirements of the beam.

Figure 10:
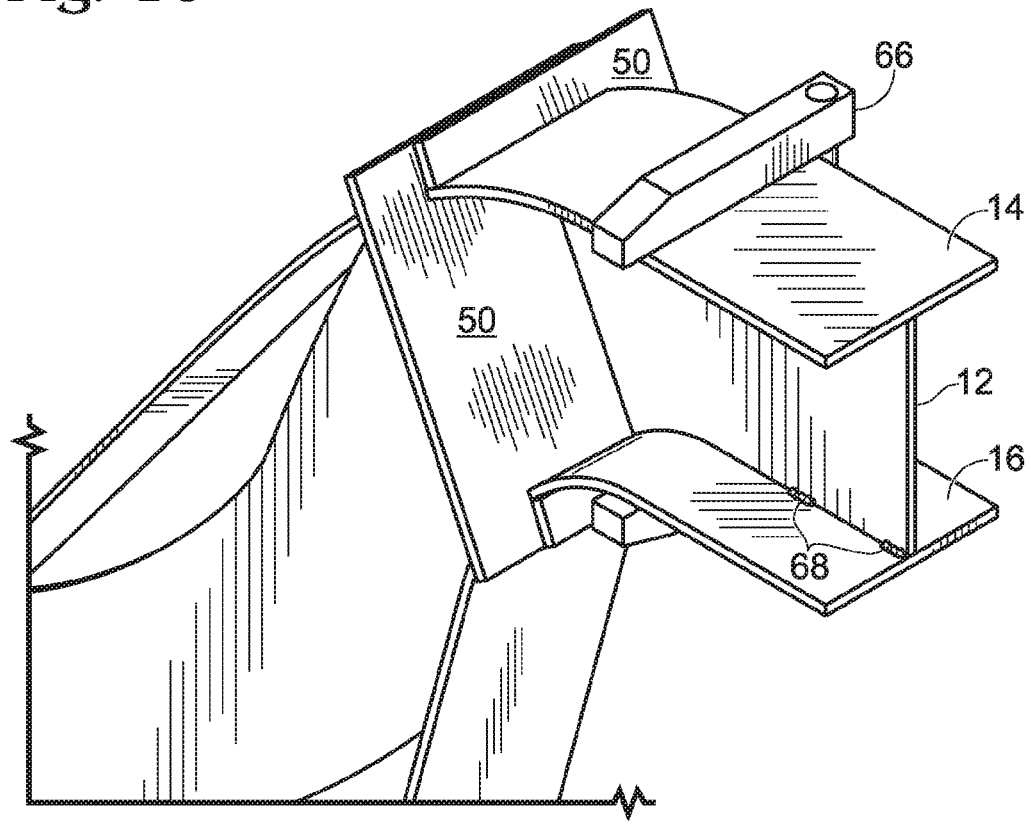
FIG. 10 is a partial left perspective view of an intermediate step in a method of constructing a first embodiment of a steel beam according to the present disclosure.

An exemplary arrangement during the process described above is shown in FIG. 10, where two flanges 14, 16 and a central web 12 are in operative association with alignment tools 50. In the Figure, first and second alignment tools 50 are closely positioned, with each tool's alignment opening supporting a flange and the alignment surface contacting the web (as in FIG. 7); thus, the alignment tools may be said to "bracket" the central I-beam structure. As illustrated in the Figure, a user may use the pair of tools 50 to initially align two flanges and a web at a given point. The user may then secure the pieces in place with a clamp 66, allowing the alignment tools to be moved to the next location along the nascent beam that has flanges and a web to be aligned. Alternatively, the user could tack weld 68 the aligned portion of the I-beam before moving the alignment tools. In either case, using a pair of alignment tools at the same time can allow a user to precisely align the components of the I-beam before tack welding or clamping the aligned arrangement before moving to and aligning the next section of the beam.

To form a beam like the one illustrated in FIGS. 1-5, the central "I" structure may only be tack-welded in place, as walls will be added to the final structure. In this case, the central "I" structure may act as a pattern for the final boxed I-beam. Once the central spine of the boxed I-beam is formed, the side walls, also cut or otherwise formed as pieces from stock material, may be lined up with the edges of the flanges. Once in final placement, the walls may be welded into place, securing them firmly with the flanges.

The alignment tool may not be necessary for the final step of securing the walls to the I-beam spine, but it may be necessary to hold the walls in place with clamps or other tools while the final fixing occurs. Typically, final placement could be done with two users and a series of clamps, with no requirement for heavy tools or machinery.

Although the present invention has been shown and described with reference to the foregoing operational principles and preferred embodiments, it will be apparent to those skilled in the art that various changes in form and detail can be made without departing from the spirit and scope of the invention. The present invention is intended to embrace all such alternatives, modifications and variances. The subject matter of the present invention includes all novel and non-obvious combinations and subcombinations of the various elements, features, functions and/or properties disclosed herein. Inventions embodied in various combinations and subcombinations of features, functions, elements, and/or properties may be claimed through presentation of claims in a subsequent application.

What is claimed is:

1. A method for manufacturing a support beam, comprising
providing a first alignment tool having a sheet-like configuration defining an alignment plane, the alignment tool being generally U-shaped including a rectangular body portion and first and second leg portions on opposing sides of the body portion, a first slot formed between the body portion and the first leg, and a second slot formed between the body portion and the second leg, the first and second slots being parallel to each other and passing through the alignment plane defined by the alignment tool, the body portion having an alignment surface extending between the first and second slots at an alignment angle,
  providing a first piece of strip material defining a first plane when the first piece is laid flat, the first piece having a first end, a second end, and a first longitudinal centerline running from the first end of the first piece to the second end of the first piece, the first longitudinal centerline being curvilinear in the first plane,
  providing a second piece of strip material defining a second plane when the second piece is laid flat, the second piece having a first end, a second end, and a second longitudinal centerline running from the first end of the second piece to the second end of the second piece, the second longitudinal centerline being curvilinear in the second plane,
  placing the first piece of strip material into the first slot of the alignment tool,
  placing the second piece of strip material in longitudinal contact with the first strip and in contact with the alignment surface of the alignment tool, such that the second piece of strip material is oriented at the alignment angle to the first piece of strip material in the alignment plane,
  permanently securing the first piece to the second piece near the alignment tool,
  moving the alignment tool longitudinally along the first and second pieces,
  repeating the aligning, securing, and moving steps until the first and second strips are attached along a desired length, the repeating step resulting in forming a rigid structure in which the first piece bends out of the first plane, and the second piece bends out of the second plane.

2. The method of claim 1, further comprising
providing a third piece of strip material defining a third plane when the third piece is laid flat, the third piece having a first end, a second end, and a third longitudinal centerline running from the first end of the third piece to the second end of the third piece, the first longitudinal centerline being curvilinear in the third plane,
  placing the third piece of strip material into the second slot of the alignment tool,
  permanently securing the third piece to the second piece near the alignment tool,
  moving the alignment tool longitudinally along the second and third pieces,
  repeating the aligning, securing, and moving steps until the second and third pieces are attached along a desired length, the repeating step resulting in forming a rigid structure in which the third piece bends out of the third plane and wherein the first, second, and third pieces form a rigid I-beam having curvature in more than one direction.

3. The method of claim 2, wherein the first and third pieces have substantially the same shape.

4. The method of claim 2, wherein the moving steps recited in claims 1 and 2 are performed together so that the first and third pieces are connected to the second piece in the same moving and repeating steps.

5. The method of claim 2, further comprising
permanently attaching a fourth piece of strip material spanning between a first longitudinal edge of the first strip of material and a first longitudinal edge of the third strip of material, forming a first wall; and
permanently attaching a fifth piece of strip material spanning between a second longitudinal edge of the first strip of material and a second longitudinal edge of the third strip of material, forming a second wall; wherein
the fourth strip and the fifth strip are substantially parallel to the second strip.

6. The method of claim 1, wherein the first piece of strip material has a varying transverse width.

7. The method of claim 1, wherein the second piece of strip material has a varying transverse width.

8. A method for manufacturing a support beam, comprising
providing a first alignment tool having a sheet-like configuration defining an alignment plane, the alignment tool being generally U-shaped including a rectangular body portion and first and second leg portions on opposing sides of the body portion, a first slot formed between the body portion and the first leg, and a second slot formed between the body portion and the second leg, the first and second slots being parallel to each other and slicing through the alignment plane defined by the alignment tool, the body portion having an alignment surface perpendicular to the first and second slots, and perpendicular to the alignment plane,
providing a first piece of strip material defining a first plane when the first piece is laid flat, the first piece having a first end, a second end, and a first longitudinal centerline running from the first end of the first piece to the second end of the first piece, the first longitudinal centerline being curvilinear in the first plane, providing a second piece of strip material defining a second plane when the second piece is laid flat, the second piece having a first end, a second end, and a second longitudinal centerline running from the first end of the second piece to the second end of the second piece, the second longitudinal centerline being curvilinear in the second plane, placing the first piece of strip material into the first slot of the alignment tool, placing the second piece of strip material in longitudinal contact with the first strip and in contact with the alignment surface of the alignment tool, such that the second piece of strip material is oriented perpendicular to the first piece of strip material in the alignment plane, permanently securing the first piece to the second piece near the alignment tool, moving the alignment tool longitudinally along the first and second pieces, repeating the aligning, securing, and moving steps until the first and second strips are attached along a desired length, the repeating step resulting in forming a rigid structure in which the first piece bends out of the first plane, and the second piece bends out of the second plane.

9. The method of claim 8, further comprising providing a third piece of strip material defining a third plane when the third piece is laid flat, the third piece having a first end, a second end, and a third longitudinal centerline running from the first end of the third piece to the second end of the third piece, the first longitudinal centerline being curvilinear in the third plane, placing the third piece of strip material into the second slot of the alignment tool, permanently securing the third piece to the second piece near the alignment tool, moving the alignment tool longitudinally along the second and third pieces, repeating the aligning, securing, and moving steps until the second and third pieces are attached along a desired length, the repeating step resulting in forming a rigid structure in which the third piece bends out of the third plane and wherein the first, second, and third pieces form a rigid I-beam having curvature in more than one direction.

10. The method of claim 9, wherein the first and third pieces have substantially the same shape.

11. The method of claim 9, wherein the moving steps recited in claims 1 and 2 are performed together so that the first and third pieces are connected to the second piece in the same moving and repeating steps.

12. The method of claim 9, further comprising permanently attaching a fourth piece of strip material spanning between a first longitudinal edge of the first strip of material and a first longitudinal edge of the third strip of material, forming a first wall; and permanently attaching a fifth piece of strip material spanning between a second longitudinal edge of the first strip of material and a second longitudinal edge of the third strip of material, forming a second wall; wherein the fourth strip and the fifth strip are substantially parallel to the second strip.

13. The method of claim 8, wherein the first piece of strip material has a varying transverse width.

14. The method of claim 8, wherein the second piece of strip material has a varying transverse width.

* * * * *